(12) United States Patent
Bleuel

(10) Patent No.: US 8,256,457 B2
(45) Date of Patent: Sep. 4, 2012

(54) SADDLE TANK

(75) Inventor: Walter Bleuel, Hofheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 1081 days.

(21) Appl. No.: 11/958,478

(22) Filed: Dec. 18, 2007

(65) Prior Publication Data

US 2008/0149199 A1      Jun. 26, 2008

(30) Foreign Application Priority Data

Dec. 20, 2006   (DE) .................. 10 2006 060 274

(51) Int. Cl.
*F04F 9/00* (2006.01)
(52) U.S. Cl. .................. 137/565.22; 137/615; 123/514
(58) Field of Classification Search .................. 123/509, 123/510, 514; 137/395, 398, 409, 412, 565.23, 137/574, 576, 615, 577, 579, 565.22; 417/158, 417/159
See application file for complete search history.

(56) References Cited

U.S. PATENT DOCUMENTS

| 4,750,513 A | * | 6/1988 | Griffin et al. ................. 137/316 |
| 4,750,522 A | * | 6/1988 | Griffin et al. ................. 137/895 |
| 5,669,359 A | | 9/1997 | Kleppner et al. |
| 6,000,913 A | * | 12/1999 | Chung et al. .................... 417/53 |
| 6,712,234 B2 | | 3/2004 | Boecker |
| 2003/0102034 A1 | | 6/2003 | Aschoff |

FOREIGN PATENT DOCUMENTS

| DE | 19528182 A1 | | 2/1997 |
| DE | 19547244 A1 | | 6/1997 |
| DE | 19709738 A1 | | 9/1998 |
| DE | 19900378 A1 | * | 7/2000 |
| DE | 10107075 A1 | | 9/2001 |
| DE | 10154150 A1 | | 5/2003 |
| GB | 2428415 A | | 1/2007 |

OTHER PUBLICATIONS

European Patent Office, European Search Report dated Mar. 13, 2008 for Application No. 07022744.2.

* cited by examiner

*Primary Examiner* — John Rivell
*Assistant Examiner* — R. K. Arundale
(74) *Attorney, Agent, or Firm* — Ingrassia Fisher & Lorenz, P.C.

(57) ABSTRACT

A saddle tank for internal combustion engines of motor vehicles includes an oblong boom, which is connected at one end to a swirl pot located in the first chamber and rests toward the other end on a lower saddle surface of the saddle and a retainer for a Venturi nozzle or pump, which is mounted so it is rotatable on the other end of the boom.

11 Claims, 6 Drawing Sheets

SADDLE TANK

CROSS-REFERENCE TO RELATED APPLICATION

This application claims priority to German Application No. DE 10 2006 060 274.9, filed Dec. 20, 2006.

TECHNICAL FIELD

The present invention relates to a saddle tank for internal combustion engines of motor vehicles.

BACKGROUND

Saddle tanks for internal combustion engines of motor vehicles are generally known. These are typically fuel containers having a first chamber, which is connected via a saddle to a second chamber having supply fuel. If the fuel level sinks below a level which lies underneath a lower saddle surface of the saddle, the two chambers are hydrodynamically decoupled. In this case, a pump or other Venturi nozzle is required to convey fuel from one chamber into the other, in which the swirl pot is located. For this purpose, the saddle tank has a separate flange for each chamber, through each of which fuel lines and electrical lines are led to the particular pump and/or Venturi nozzle.

It is an object of one embodiment of the present invention to provide a saddle tank of the type cited at the beginning which manages using only one flange for both pumps and/or Venturi nozzles. In addition, other objects, desirable features and characteristics will become apparent from the subsequent detailed description and the appended claims, taken in conjunction with the accompanying drawings and foregoing background.

SUMMARY

A first embodiment of the present invention relates to a saddle tank for internal combustion engines of motor vehicles. The saddle tank therefore comprises a first chamber which is connected via a saddle to a second chamber having supply fuel. The saddle tank has an oblong boom, which is connected at one end to a swirl pot located in the first chamber and rests on a lower saddle surface of the saddle toward the other end. Furthermore, a rotatably mounted retainer for a Venturi nozzle or a pump is located at the other end of the boom.

The saddle tank has a flange for the swirl top, which may be located in a first chamber K1. The boom having retainer is introduced during the mounting through this flange. The Venturi nozzle or pump fastened to the retainer is then situated in the second chamber. This design allows the Venturi nozzle or pump provided for the second chamber K2 to be inserted into the interior via the flange assigned to the first chamber K1. As a result, a second flange is not required for the second chamber K2. The production of the saddle tank is thus simplified, because the flange is typically introduced after providing the blowmolded saddle tank. Furthermore, separate fuel lines and electrical supply lines are saved by not requiring the second flange, because all of them may be led via the combination of boom and retainer. Both aspects result in lower costs of the saddle tank. In addition, saving the second flange allows optimization of the tank geometry and, in addition, optimized exploitation of the existing space in the motor vehicle and thus of the fuel container volume.

In a second embodiment, the boom is a bendable tube, e.g., implemented as a corrugated tube. This tube, e.g., made of PA11, is flexible and/or bendable on one hand, so that it may be inserted through the flange and then brought into position inside the fuel container. On the other hand, it is also sufficiently rigid for this purpose so that once it is brought into position, it remains stable there. It protects all fuel lines and electrical supply lines led via the boom to the outside and simultaneously allows fuel to flow from the second chamber K2 through the boom into the swirl pot, which is located in the first chamber K1.

In a third embodiment, a support in relation to the upper shell of the saddle tank is provided for the other end of the boom. This ensures stable mechanical positioning of the boom even when the vehicle is moving. It is to be noted here that the saddle tank does not have to be assembled from an upper shell and a lower shell as in earlier fuel containers in sheet-metal construction, but rather the term upper shell generally refers to the upper area of the fuel container.

In a further embodiment, an extension is fastened to the other end of the boom, on which the retainer and the support are each rotatably mounted. The support allows the unit made of boom and retainer to be inserted in a first, oblong orientation first through the flange, then through a lateral opening in the swirl pot into the chamber K1, and to be brought into position by being laid on the lower saddle surface. This may be performed in such a way that the boom allows the insertion by a suitable shape and subsequently is brought into the rated position by a rotation around 90°. The boom is then mounted rotationally locked on the swirl pot and engages there. The selection of the extension thus allows, in combination with the rotatable mounting of support and holder, the cited unit to be inserted into the interior of the saddle tank with the limited available space.

Furthermore, an embodiment is provided in which a spring engaging on the retainer and on the support is provided, which may be transferred from a first pressure-loaded position via a dead center into a second pressure-loaded position. The trigger for transferring the spring from one position into the other may be a thread or may be a wire and/or cable.

In a further embodiment, a fuel line, which sectionally has a larger diameter, is provided for transferring fuel from the chamber K2 into the chamber K1. This allows the cross-sectional constriction to be made usable when pulling on the fuel line, because a mechanical element is thus moved, using which the above-mentioned spring is transferred from the first pressure-loaded position, the mounting position, via the dead center into the second pressure-loaded position, the functional position. This may be performed in such a way that the fuel line is generally implemented in its curved section in the area of the extension as a corrugated tube, but has no corrugation at the cited mechanical element. If the fuel line is pulled on, the cross-sectional enlargement is used for the movement of the mechanical element.

Furthermore, an embodiment is provided in which the retainer is the relaxation tube of the Venturi nozzle or comprises it. This embodiment has an especially simple construction at low weight.

In the design of the embodiment of the last paragraph, the transfer of fuel from the chamber K2 into the chamber K1 is especially easy if the end of the relaxation tube facing toward the boom is expanded into an overflow. After the fuel has flowed through the relaxation tube, it pours into the overflow and may flow from there into the boom implemented as a hose or tube. It suggests itself that the contact point of the boom on the lower saddle surface be above the fastening point of the boom on the swirl pot, so that the fuel flows downward into the swirl pot because of the corresponding inclination of the boom.

In a further embodiment, a tank measuring device is mounted on the retainer, whose electrical supply line is led along the boom or through the boom to the flange of the swirl pot. The fill level in the chamber K2 may be determined using the tank measuring device. A second flange is avoided by this positioning and laying of the electrical supply lines.

Furthermore, an embodiment is provided in which a float is rotatably mounted on the retainer. The float is used to determine the fill level in the chamber K2, as is typical.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
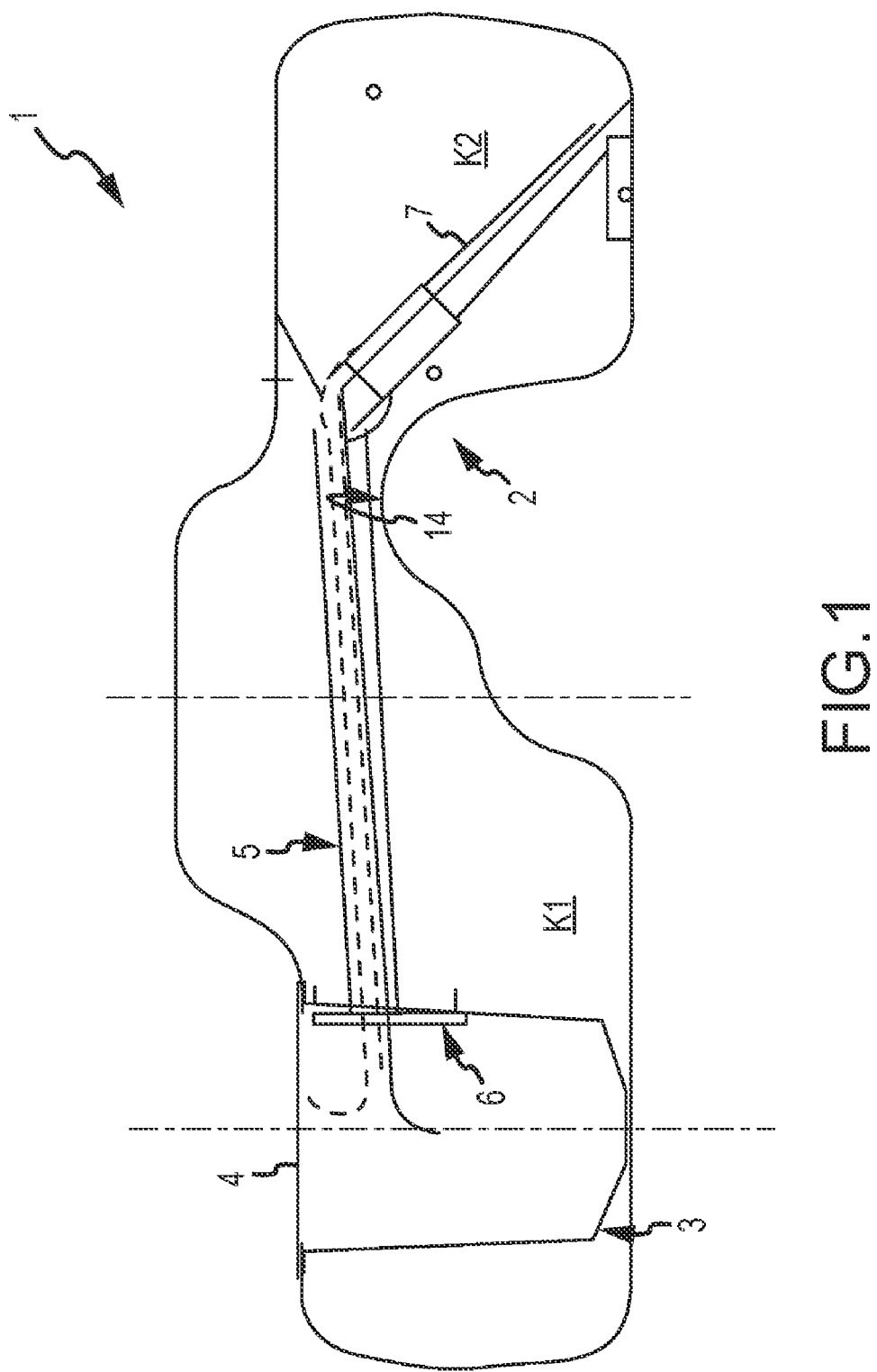
FIG. 1 shows a saddle tank having boom and retainer in overview.

In the figures, which generally identify identical objects using identical reference numerals, FIG. 1 shows a saddle tank 1 having a first chamber K1 and a second chamber K2, which are separated from one another by a saddle 2. The saddle and/or the area between the two chambers K1, K2 is used for leading through the driveshaft and the exhaust pipe. A swirl pot 3 is located in the first chamber K1. The chamber K1 has a flange 4, which is introduced subsequently into the blowmolded saddle tank 1.

The saddle tank 1 has a boom 5, which is connected at one end via a carrier 6 to the swirl pot 3. A retainer 7 for a Venturi nozzle or pump is located at the other end of the boom 5.

Figure 2:
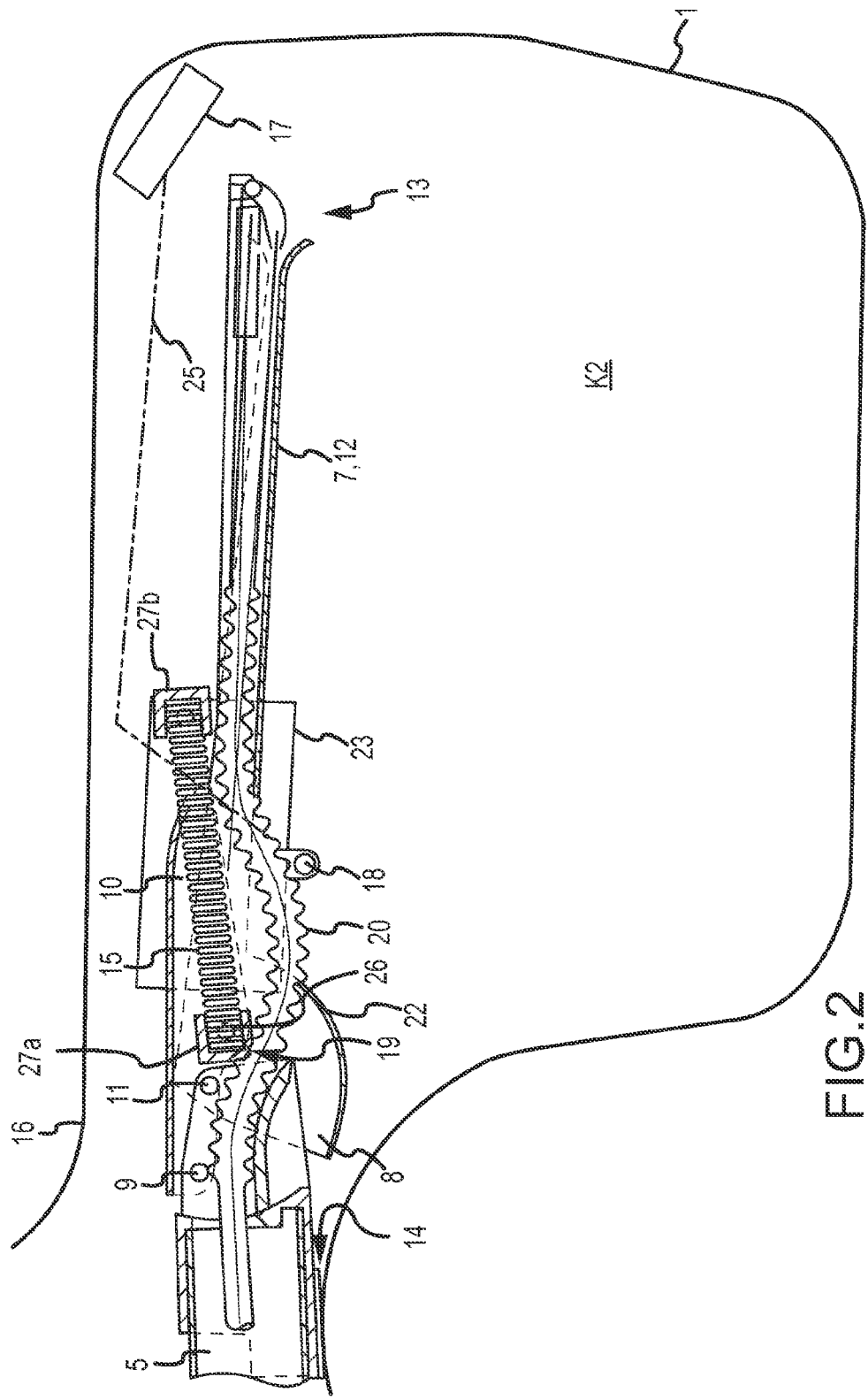
FIG. 2 shows the chamber K2 of the saddle tank having the introduced retainer in its mounting position.
Figure 4:
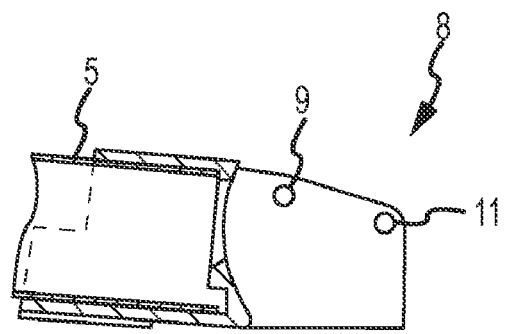
FIG. 4 shows the extension of the boom.
Figure 5:
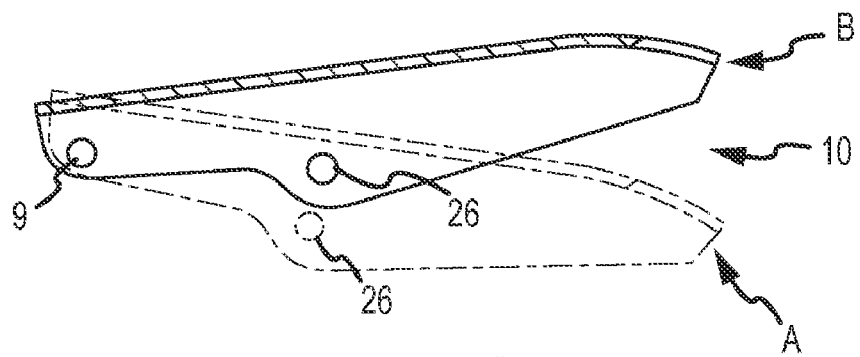
FIG. 5 shows the support in mounting and functional positions.

FIG. 2 shows the chamber K2 of the saddle tank 1 of FIG. 1. An extension 8, see also FIG. 4 in this regard, is located at the other or right end of the boom 5. A support 10 is fastened thereon so it is rotatable around the axis 9, see also FIG. 5 in this regard. Furthermore, the extension 8 has an axis 11, around which the relaxation tube 12 of the Venturi nozzle 13 may be rotated. As will be explained in greater detail below, the relaxation tube 12 functions as the retainer 7.

FIG. 2 shows the unit made of boom 5 and retainer 7 in its mounting position. During the mounting of the saddle tank 1, the unit made of boom 5 and retainer 7 shown in FIG. 2 is first introduced through the flange 4 into the saddle tank 1, is then led through the opening in the swirl pot 3 in the area of the carrier 6, and then comes to rest on the lower saddle surface 14 of the saddle 2.

Figure 3:
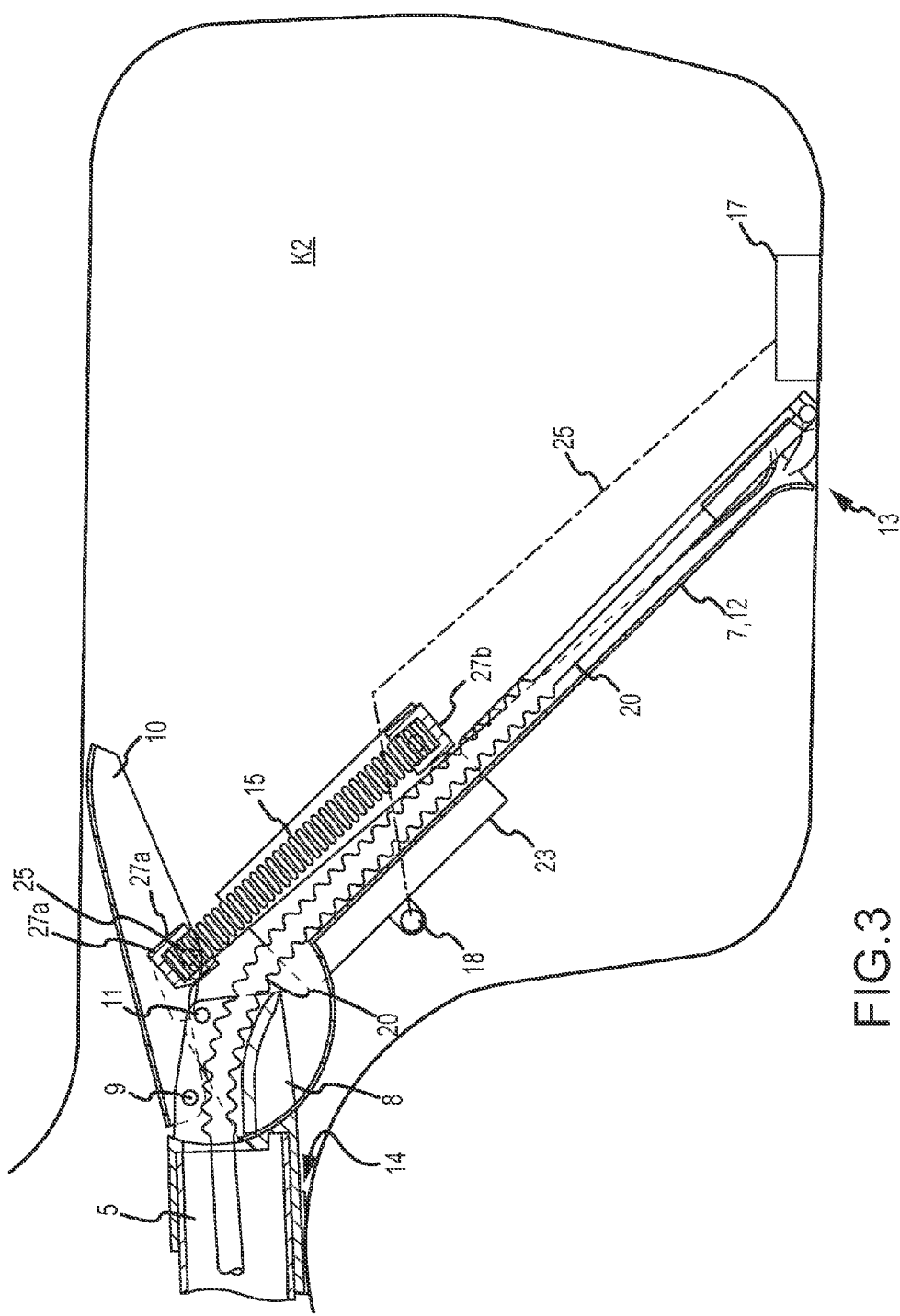
FIG. 3 shows the chamber K2 of the saddle tank having the introduced retainer in its functional position.

Subsequently, in the event of unlocking, see FIG. 6 in this regard, a spring 15 is transferred by rotation around the axis 26 from a first pressure-loaded position A into a second pressure-loaded position B, i.e., the functional position. The support 10 pivots starting from the mounting position A around the axis 9 upward into the functional position B, see FIG. 5. It is then supported against the upper shell 16. The position of the retainer 7 is transferred from the mounting position A shown in FIG. 2 into the functional position B shown in FIG. 3, see also FIG. 7 in this regard. The retainer 7 is then pressed by the spring tension against the saddle tank floor. Upon unlocking, the float lever 25 is also released and also pivots with the float 17 downward, because it is mounted on the retainer 7 so it is rotatable via a rotational axis 18.

Figure 6:
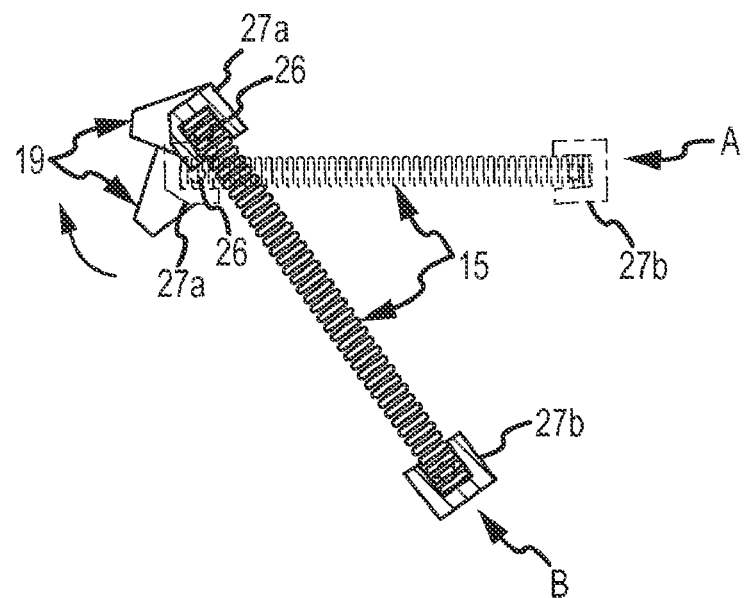
FIG. 6 shows the first and second pressure-loaded positions of the spring associated with the retainer.
Figure 7:
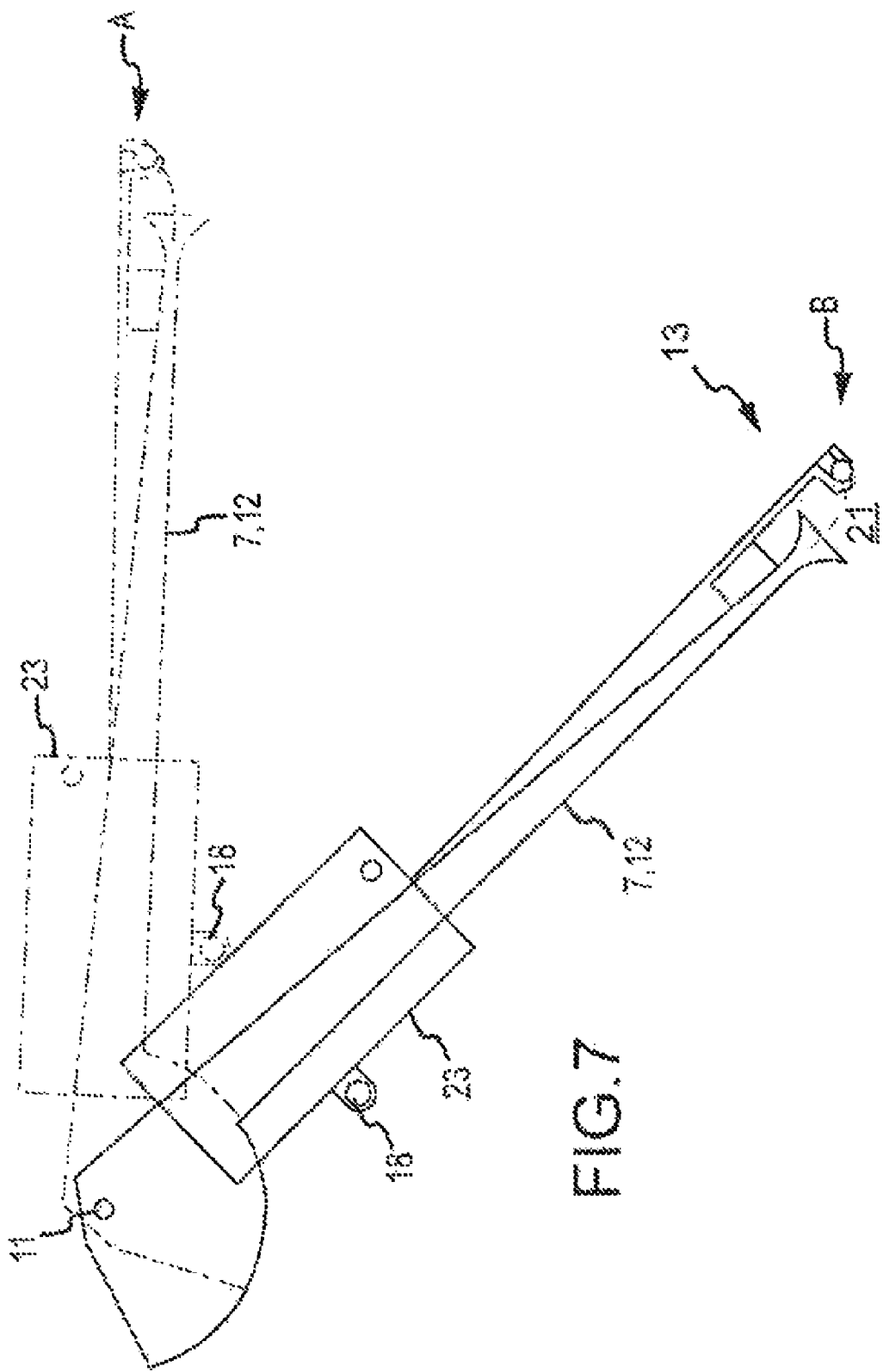
FIG. 7 shows the retainer in mounting and functional positions.
Figure 8:
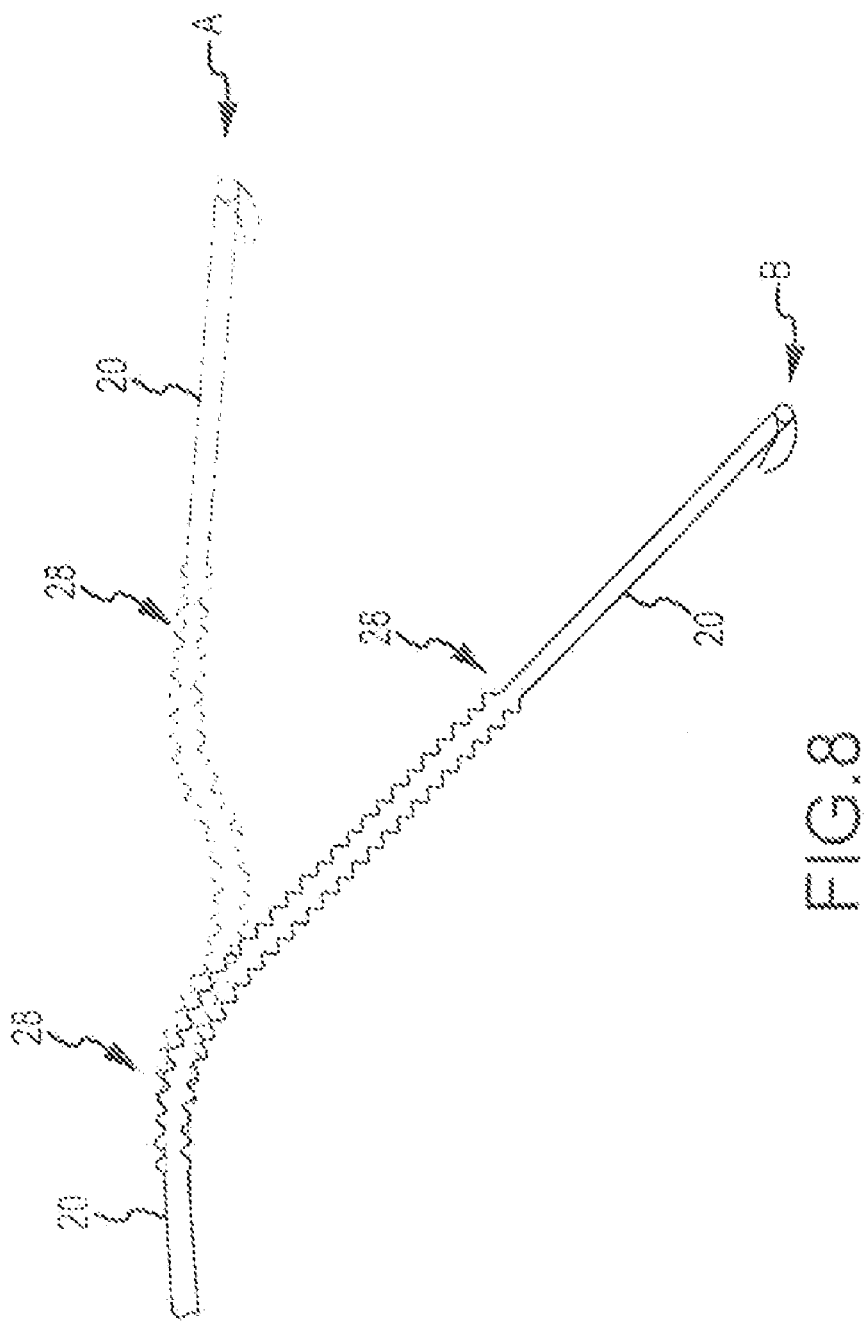
FIG. 8 shows the fuel line in mounting and functional positions.

For the unlocking, i.e., the actuation of the spring 15, spring bearing 27a (in the Figures, an additional spring bearing 27b is also depicted) has a U-shaped part 19, which may be seen in FIG. 2, see also FIG. 6. Furthermore, the fuel line 20 is sectionally implemented as a corrugated hose. In the mounting position, the fuel line 20 guided past the U-shaped part 19 is provided without corrugation. If one pulls on the fuel line 20 from the flange 4, a corrugated hose section 28, see FIG. 8, reaches the U-shaped part 19 of the spring bearing 27a. The U-shaped part 19 is moved in the direction of the arrow shown in Figure 2 and raised at the same time by the diameter enlargement of the fuel line 20 there. In this way, the spring 15 passes a dead center and is transferred from its first pressure-loaded position A to the second pressure-loaded position B.

In accordance with an exemplary embodiment, in use, fuel reaches the Venturi nozzle 13, where fuel is suctioned out of the chamber K2 in a suction area 21 of the Venturi nozzle 13, through the fuel line 20 via the boom 5 and the retainer 7. The fuel then reaches the relaxation tube 12, which opens into an overflow 22. It may be seen from the operating position shown in FIG. 3 that the fuel may then flow from the overflow 21 into the boom 5, which is implemented as a flexible tube. It is obvious from FIG. 1 that the fuel flows directly from the boom 5 into the swirl pot 3.

The fuel level is measured in chamber K2 with the aid of the tank measuring device 23, which is connected via electrical supply lines to the onboard electronics. These lines are led along boom 5, as shown in FIG. 1, and are then led through the flange 4.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A saddle tank for internal combustion engines of motor vehicles, comprising:
   a saddle;

an oblong boom, which is connected at a first end to a swirl pot located in a first chamber and rests toward a second end on a lower saddle surface of the saddle; and a retainer, mounted at the second end of the oblong boom so that the retainer is rotatable, for at least one of a Venturi nozzle and pump.

2. The saddle tank according to claim 1, wherein the oblong boom is a bendable tube.

3. The saddle tank according to claim 1, wherein a support against an upper shell of the saddle tank is provided for the second end of the oblong boom.

4. The saddle tank according to claim 3, wherein an extension is fastened to the second end of the boom, on which the retainer and the support are each mounted so that the retainer and the support are rotatable.

5. The saddle tank according to claim 3, having a spring engaging on the retainer and on the support, which may be transferred from a first pressure-loaded position via a dead center to a second pressure-loaded position.

6. The saddle tank according to claim 1, wherein a fuel line to the Venturi nozzle is provided, the fuel line sectionally having a larger diameter.

7. The saddle tank according to claim 6, wherein the fuel line comprises a corrugated tube.

8. The saddle tank according to claim 1, wherein the retainer is a relaxation tube of the Venturi nozzle.

9. The saddle tank according to claim 8, wherein an end of the tube facing toward the oblong boom is implemented as an overflow.

10. The saddle tank according to claim 1, wherein a tank measuring device is mounted on the retainer, and an electrical supply line is led along the oblong boom or through the oblong boom to a flange of the swirl pot.

11. The saddle tank according to claim 1, wherein a float lever is mounted on the retainer so that the float level is rotatable.

* * * * *